Dec. 15, 1931.  W. D. FERRIS  1,836,232
BALL BEARING HINGE
Filed Dec. 5, 1929
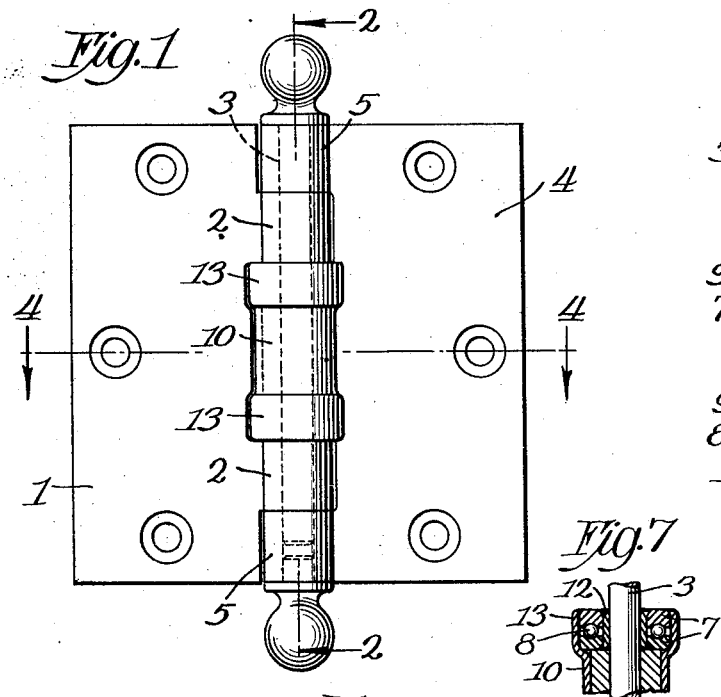
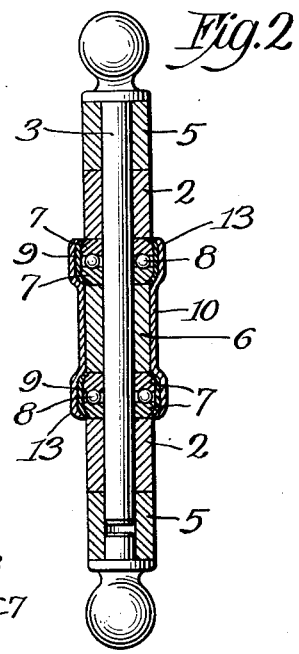
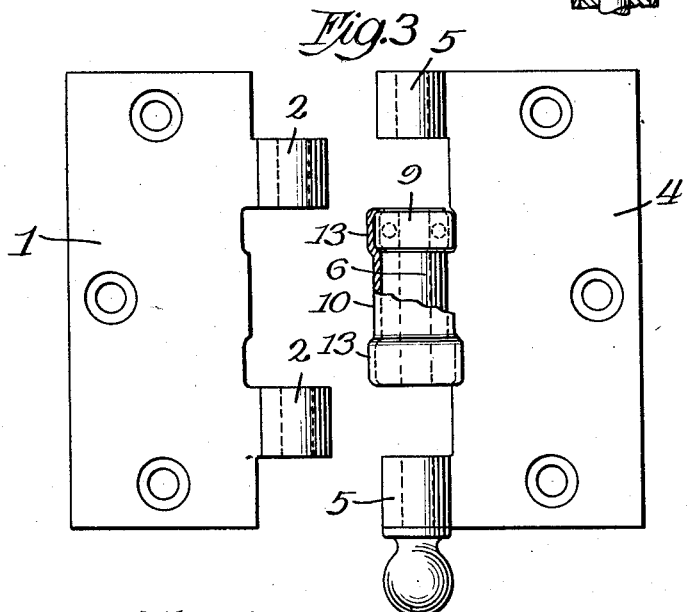
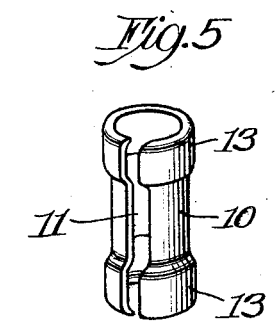
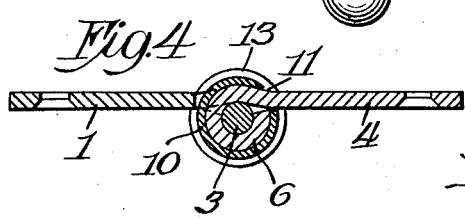
Inventor
William D. Ferris
By Arthur H. Durand
Atty.

Patented Dec. 15, 1931

1,836,232

UNITED STATES PATENT OFFICE

WILLIAM D. FERRIS, OF STERLING, ILLINOIS, ASSIGNOR TO FRANTZ MANUFACTURING CO., OF STERLING, ILLINOIS, A CORPORATION OF ILLINOIS

BALL-BEARING HINGE

Application filed December 5, 1929. Serial No. 411,735.

This invention relates to hinges for doors or other closures, and more particularly to doors or windows that swing about vertical axes, whereby the weight is sustained by an axial thrust on the knuckles of the hinge.

Generally stated, the object of the invention is to provide a novel and improved construction whereby a hinge of this character is provided with ball bearings in the form of units that are held in place on one leaf of the hinge, preferably on the middle knuckle thereof, by an external sleeve that encloses the said units, as well as the said knuckle.

It is also an object to provide certain details and features of construction and combinations tending to increase the general efficiency and the desirability of a ball bearing hinge of this particular character.

To the foregoing and other useful ends, the invention consists in matters hereinafter set forth and claimed and shown in the accompanying drawings, in which—

Fig. 1 is a front elevation of a hinge involving the principles of the invention;

Fig. 2 is a vertical section on line 2—2 in Fig. 1;

Fig. 3 is a view similar to Fig. 1, but showing the leaves of the hinge separated, and showing certain portions of the hinge in vertical section, and other portions broken away;

Fig. 4 is a horizontal section on line 4—4 in Fig. 1;

Fig. 5 is a perspective of one of the parts of said hinge.

Fig. 6 shows another form of the invention.

Fig. 7 shows another form of the invention.

As thus illustrated, the hinge comprises a leaf 1 having knuckles 2 for the pintle or pin 3 of the hinge. The leaf 4 is provided with the knuckles 5 and 6, the latter being the middle knuckle of the leaf.

The ball races 7 encircle the pintle 3, and are provided with anti-friction balls 8, each ball race unit comprising a pair of races with the said balls between. Each ball race unit is interposed between one end of the knuckles 2 and the end of the knuckle 6, whereby the weight of a door or window or other object will be sustained by the anti-friction balls, making the hinge easy to operate, as will be readily understood.

The housing for the ball races comprises the inner rings 9 that peripherally encircle the two ball race units, and the outer housing sleeve 10 formed to not only house the ball race units, but also the middle knuckle 6 of the hinge. The sleeve 10 has a longitudinal slot 11 on one side thereof for the adjacent flat portion of the leaf 4 of the hinge. In this way, the housing for the ball races has the double function of holding the races and balls in assembled relation and of retaining the two ball race units on the knuckle 6 of the leaf 4 of the hinge. Thus, no separate means, in addition to the housing, is necessary to hold the ball race units on the knuckle 6 of the hinge.

In Fig. 6, the inner section 9 of the housing is omitted, so that the outer section 10 directly engages the races 7 and holds them in assembled relation.

In Fig. 7, the races are, in the first instance, held in assembled relation by the inner tube or tubular core 12, before the sleeve 10 is applied.

Therefore, in each form of the invention, the outer housing for the ball races has the function of holding the ball units on the knuckle 6 of the hinge, as well as of holding the ball races of each unit in assembled relation; and while, in Fig. 7, additional means 12 is provided for primarily holding the opposing ball races in assembled relation, it is obvious that the said means 12 is not a housing for the races, but, to the contrary, forms a hollow core which engages the pintle 3, as shown and described.

The housing sleeve 10, it will be seen, is preferably provided with expanded end portions 13 to enclose the ball race units, and when the sleeve 10 and its end portions 13 are forced tightly around the knuckle 6 and around the ball races, the latter are anchored in place on the ends of said ball knuckle.

It will be seen that the three different forms of the invention shown and described can be used in combination with each other in the same hinge structure, if such is necessary or desirable, to suit the requirements of different situations. It will be seen, of course, that in Fig. 2 the ball races 7 are loose and can turn in the bands or rings 9, so that one race can turn relatively to the other, in each ball bearing unit. In Fig. 6, the ball races 7 are loose in the portion 13, so that one race can rotate relatively to the other. Similarly, in Fig. 7, the ball races 7 are loose in the portion 13, and are also loose on the tubular core 12, whereby one race may rotate relatively to the other, when the door or window or other closure is opened or closed, whereby the antifriction balls sustain the weight of the door or window or other closure.

What I claim as my invention is:

1. In a hinge, the combination of plates forming leaves of the hinge, with each plate provided with knuckles, a pintle extending through said knuckles, raceways with balls between them, forming a unit interposed between the ends of a knuckle on one leaf and a knuckle on the other leaf, and a housing for said raceway unit, said housing having exposed means whereby said raceway unit is secured to the exterior of one of the knuckles, and thereby to one of said leaves, said housing comprising a sleeve enclosing the middle knuckle of one of said leaves, forming said exposed means, said housing having an end portion for enclosing said raceway unit.

2. In a hinge, the combination of plates forming leaves of the hinge, with each plate provided with knuckles, a pintle extending through said knuckles, raceways with balls between them, forming a unit interposed between the ends of a knuckle on one leaf and a knuckle on the other leaf, and a housing for said raceway unit, said housing having exposed means whereby said raceway unit is secured to the exterior of one of the knuckles, and thereby to one of said leaves, said housing comprising a sleeve enclosing the middle knuckle of one of said leaves, said sleeve having an expanded end portion forming said housing and directly engaging and surrounding said raceways.

3. In a hinge, the combination of plates forming leaves of the hinge, with each plate provided with knuckles, a pintle extending through said knuckles, raceways with balls between them, forming a unit interposed between the ends of a knuckle on one leaf and a knuckle on the other leaf, and a housing for said raceway unit, said housing having exposed means whereby said raceway unit is secured to the exterior of one of the knuckles, and thereby to one of said leaves, comprising a similar axially alined raceway unit, with the middle knuckle of one hinge plate interposed between the two units, and with said housing having a middle portion enclosing said middle knuckle and having expanded end portions surrounding said units.

4. A ball bearing hinge comprising plates having interfitting knuckles, a pintle extending through said knuckles, raceway rings with balls between them, forming a unit interposed between the ends of adjacent knuckles, and an outer sleeve on one of the knuckles, said sleeve having means to hold said unit in place, said sleeve being split at one side to receive the plate of the knuckle, holding the unit in position when said pintle is withdrawn.

Specification signed this 2d day of December, 1929.

WILLIAM D. FERRIS.